June 27, 1944.    G. G. McNAMARA, JR    2,352,487
WHEEL
Filed Sept. 11, 1942
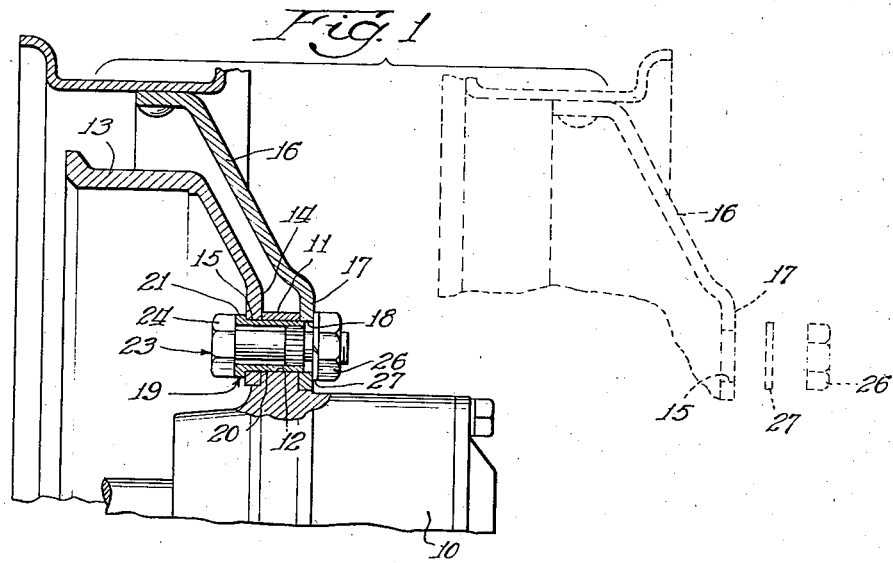
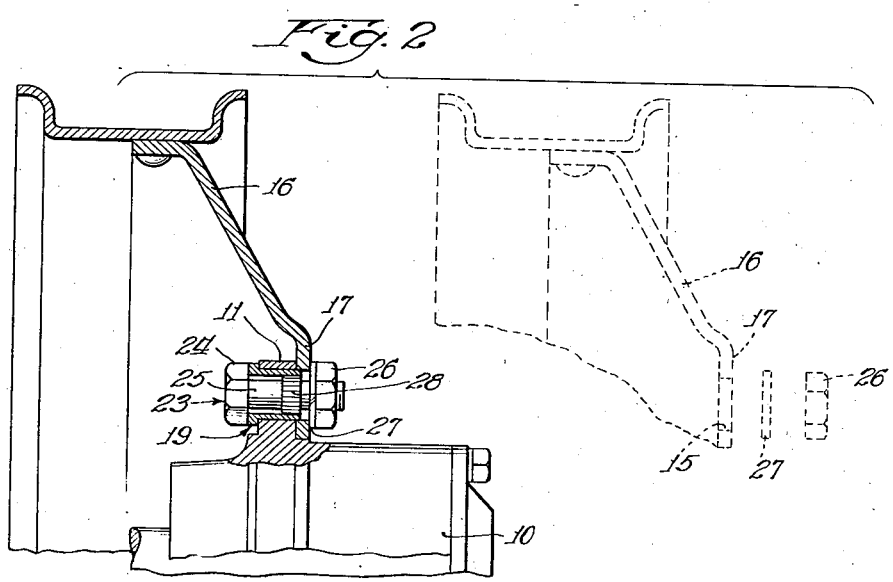
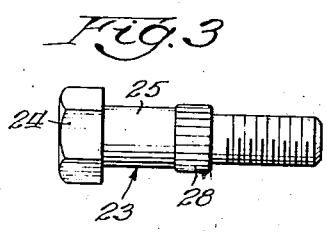
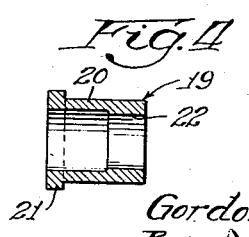
Inventor:
Gordon G. McNamara, Jr.
By: Paul O. Pippel
Atty.

Patented June 27, 1944

2,352,487

UNITED STATES PATENT OFFICE 2,352,487

WHEEL

Gordon G. McNamara, Jr., Chicago, Ill., assignor to International Harvester Company, a corporation of New Jersey Application September 11, 1942, Serial No. 457,980

4 Claims. (Cl. 301—9)

This invention relates to a wheel and, more particularly, to a wheel of the type comprising a hub and a removable wheel body.

The invention pertains particularly to a wheel of the type carrying a pneumatic tire and demountable from the hub or carrier. In the use and structure of such wheel it becomes important that the bolts that secure the assembly together remain in retained positions on the hub or carrier when the wheel body is removed. Heretofore the desirable result has been obtained by various methods, principally by the welding or riveting of the bolts or studs in place in the hub. However, this construction is characterized by the defect that bolts so fastened in place cannot be easily removed when it becomes necessary to dismantle or otherwise effect alterations in the wheel assembly.

The principal object of the present invention is to provide an improved wheel assembly having a novel and desirable means for securing the assembly together.

It is an important object of the invention to provide means for removably retaining a securing element in place on a wheel carrier, so that the wheel normally carried thereby may be easily removed.

It is an object of the invention to provide a simplified retaining and securing means that is adaptable for change-over structures in the wheel assembly.

And, another object of the invention is to provide the retaining means in the form of a deformable member capable of deformation or expansion for securement, at least temporarily, to the wheel carrier.

Other objects and features of the invention will become apparent as the disclosure is more fully made in the following detailed description taken in conjunction with the accompanying sheet of drawings, in which:

Figure 1 is a transverse sectional view of one form of wheel embodying a preferred form of the invention, the broken lines indicating the wheel body as removed from the hub or carrier assembly;

Figure 2 is a similar view of a modified form of assembly in which a wheel body is secured directly to a hub or carrier member, the brake drum of Figure 1 being omitted;

Figure 3 is a detail view of the securing bolt; and,

Figure 4 is a detail view in section of the retaining sleeve.

The principles of the invention may be embodied in any form of wheel assembly, it being understood that the particular form of wheel structures illustrated are only illustrative and not limiting.

In Figure 1, the wheel assembly is shown as including a hub 10 having a radially outwardly disposed flange 11 formed with an opening or bore 12 therein parallel to the rotating axis of the hub. An intermediate member in the form of a brake drum 13 has a radial flange 14 formed with an opening or bore 15 therein. The drum 13 is assembled on the hub 10 with the outer face of the radial flange 14 of the drum abutting the inner radial face of the flange 11 of the hub and with the openings 12 and 15 in alinement. The structure just described comprises generally the carrier assembly for carrying a wheel 16.

The wheel includes a wheel body having a dished face including an interior radial flange portion 17 formed with an opening 18. The inner radial face of the flange 17 abuts the outer radial face of the flange 11 of the hub 10, and the opening 18 in the wheel is alined with the openings 12 and 15 in the hub 10 and the drum 13, respectively.

The wheel assembly is maintained together, or in assembled relation, by a plurality of securing means. In the usual form of wheel the securing means are circumferentially spaced about an interior portion of the assembly, these means usually being identical. The same is true in the particular form of wheel illustrated herein, and it, therefore, becomes necessary to describe only one of the securing means, it being understood that the others are similar.

The securing means of the wheel includes retaining means comprising preferably a deformable element in the form of a sleeve 19 having a cylindrical portion 20 passing through openings 15 and 12 in the brake drum and hub, respectively. In a preferred form of the invention one end of the sleeve protrudes from the hub flange 11 slightly into the opening 18 in the wheel flange 17, and this serves as a pilot member facilitating mounting of the wheel on the carrier structure. The other end of the sleeve includes an external annular flange portion 21 that abuts the inner radial face of the brake drum flange 14. The sleeve is preferably deformable and includes means within its interior providing for the deformation or expansion of the sleeve within at least one of the openings 12 or 15. The structure of the sleeve is best shown in Figure 4, wherein the means just referred to takes the form of a radially inwardly extending annulus providing an annular lug portion 22 having a diameter smaller than the inside diameter of the remainder of the sleeve. When the sleeve is inserted through the openings 15 and 12 of the brake drum and hub, the annular lug 22 is disposed within the opening 12 in the hub 10.

The securing means for maintaining the wheel parts in assembled relation preferably consists of a bolt 23 having a head 24 abutting the flange 21 on the sleeve 19 and a shank 25 passing through the sleeve 19 and outwardly through the opening 18 in the wheel flange 17. The shank is threaded to receive a securing element in the form of a nut 26 and lock washer 27. An intermediate portion of the shank 25 of the bolt is enlarged to provide means for expanding or deforming the sleeve 19 when the bolt is driven through the sleeve. This means preferably takes the form of a serrated annulus 28 having a diameter slightly larger than the diameter of the bolt shank 25 and substantially equal to the inside diameter of the sleeve 19. When the bolt 23 is driven into place in the wheel assembly, the serrated annulus 28 deforms the annulus 22 of the sleeve 19, thus extending or wedging the sleeve tightly into place within the opening 12 of the hub flange 11. At the same time the engagement between the bolt and sleeve serves to wedge the bolt tightly into the sleeve. Because of the serrations on the bolt, the sleeve and bolt are held non-rotatably in the assembly. The expansion of the sleeve is such that the sleeve is not expanded within the opening 18 of the wheel flange 17, and thus the wheel may be easily removed without interference from the sleeve.

When the sleeve and bolt are securely wedged in retained position with respect to the hub 11, the flange 21 on the sleeve serves as retaining means for maintaining the hub and brake drum in assembled relation. Therefore, when the nut 26 and washer 27 are removed from the bolt 23, the bolt will not drop out of its place in the carrier part of the wheel assembly. This result is indicated in broken lines in Figure 1.

The structure shown in Figure 2 is very similar to that shown in Figure 1 with the exception that the brake drum 18 has been omitted. For the sake of convenience the parts in Figure 2 bear the same reference characters as corresponding parts in Figure 1, although it is to be noted that the sleeve 19 in the case of Figure 2 is somewhat shorter than the sleeve in Figure 1.

The value of the securing means provided by the invention is emphasized in the assembling of wheels at the source of production or sale. In many instances a user may require a wheel assembly of the type shown in Figure 1, while other users may require an assembly of the type shown in Figure 2, and in some instances the requirement may be of both types of assemblies. Such condition may exist where an order is placed for a four-wheel vehicle and it is specified that the vehicle is to have brakes on only the rear wheels. The retailer or manufacturer may then utilize identical parts for the front and rear wheels, with the exception that the brake drums 13 may be omitted where specified. In such case the parts may be easily assembled with the front wheels including only the hub 10, sleeve 19, and wheel 16 together with the bolt 23 and nut 26, whereas the rear wheel assemblies will include in addition the brake drum 13, which will be held in place by the securing means provided by the sleeve 19 in that case.

It will thus be seen that the providing of necessary wheel assemblies is made an easy matter, and a stock of substantially identical parts, together with necessary additional parts, eliminates the necessity of having separate carrier structures originally provided as rigid assemblies having mounting bolts welded or otherwise permanently secured therein.

Undoubtedly other features of the invention will suggest themselves to those versed in the art. It will be understood, of course, that the foregoing description and illustration pertain to only a preferred form of the invention and that numerous modifications and alterations may be made therein without departing from the spirit and scope of the invention as defined in the appended claims.

What is claimed is:

1. A wheel assembly comprising a hub having a radially disposed flange portion formed with an opening therein parallel to the hub axis; a wheel having a wheel body mounted on the hub for axial removal from the hub and including a radially disposed portion formed with an axially directed opening alined with the opening in the hub flange; an annular expansible sleeve fitting the opening in the hub flange; a bolt passing through the sleeve and through the opening in the wheel body and having a nut securing the hub and wheel together, said bolt including an enlarged portion parallel with the bolt and engaging and expanding the sleeve within the hub opening, with the result that the bolt and sleeve are retained in the hub flange when the wheel body is removed from the hub.

2. A wheel assembly comprising a hub having a radially disposed flange portion formed with an opening therein parallel to the hub axis; a wheel having a wheel body mounted on the hub for axial removal from the hub and including a radially disposed portion formed with an axially directed opening alined with the opening in the hub flange; an annular sleeve fitting the opening in the hub flange and having an inwardly projecting annular lug; a bolt passing through the sleeve and through the opening in the wheel body and having a nut securing the hub and wheel together, said bolt including an enlarged, externally serrated collar portion engaging and expanding the annular lug of the sleeve within the opening of the hub flange to secure the sleeve in the hub flange and to secure the bolt non-rotatably within the sleeve, with the result that the sleeve and bolt are retained in the hub flange upon removal of the wheel body from the hub.

3. A wheel assembly comprising a hub having a radially disposed flange portion formed with an opening therein parallel to the hub axis; a wheel having a wheel body mounted on the hub for axial removal from the hub and including a radially disposed portion formed with an axially directed opening alined with the opening in the hub flange; a sleeve fitting the opening in the hub flange and having a portion thereof protruding from the flange to serve as a pilot entering the opening in the wheel body; a bolt passing through the sleeve and through the opening in the wheel body and including a nut holding the wheel and hub together, said bolt having an enlarged portion thereon expanding the sleeve within the hub opening but not within the wheel-body opening, with the result that the sleeve and bolt are retained in the hub flange upon removal of the wheel body from the hub.

4. A wheel assembly comprising a hub having a radially disposed flange portion formed with an opening therein parallel to the hub axis; a brake drum having a radially disposed flange portion formed with an axially directed opening alined with the hub-flange opening; a wheel having a wheel body mounted on the hub for axial removal from the hub and including a radially disposed portion formed with an axially directed opening alined with the openings in the brake drum flange and an annular expansible sleeve passing through the hub-flange and the brake-drum flange openings having an internal annular rib; a bolt passing through the sleeve and including a nut holding the wheel, hub, and brake drum together, said bolt having an external annular rib parallel with said bolt engaging and expanding the internal annular rib of the sleeve within the opening of at least one of the flange portions, whereby the bolt, sleeve, hub, and brake drum are retained at least temporarily together when the wheel body is removed.

GORDON G. McNAMARA, Jr.